(12) United States Patent
Besombe et al.

(10) Patent No.: US 9,178,711 B2
(45) Date of Patent: Nov. 3, 2015

(54) METHOD AND SYSTEM FOR THE DYNAMIC MANAGEMENT OF THE TRANSMISSION OF STREAMS WITHIN A PLURALITY OF TERMINALS

(75) Inventors: Philippe Besombe, Louannec (FR); Guillaume Collin, Goudelin (FR); François Toutain, Louannec (FR)

(73) Assignee: Orange, Paris (FR)

( * ) Notice: Subject to any disclaimer, the term of this patent is extended or adjusted under 35 U.S.C. 154(b) by 352 days.

(21) Appl. No.: 12/279,608

(22) PCT Filed: Feb. 13, 2007

(86) PCT No.: PCT/FR2007/050796
§ 371 (c)(1),
(2), (4) Date: Aug. 15, 2008

(87) PCT Pub. No.: WO2007/093739
PCT Pub. Date: Aug. 23, 2007

(65) Prior Publication Data
US 2009/0100190 A1    Apr. 16, 2009

(30) Foreign Application Priority Data
Feb. 16, 2006  (FR) ...................................... 06 50556

(51) Int. Cl.
*H04L 12/28* (2006.01)
*H04L 29/06* (2006.01)
*H04L 29/08* (2006.01)

(52) U.S. Cl.
CPC .......... *H04L 12/2803* (2013.01); *H04L 12/282* (2013.01); *H04L 65/103* (2013.01); *H04L 65/104* (2013.01); *H04L 67/14* (2013.01); *H04L 12/2832* (2013.01); *H04L 65/60* (2013.01); *H04L 2012/2849* (2013.01)

(58) Field of Classification Search
CPC ........................................................ H04L 65/60
USPC ........................................................ 709/231
See application file for complete search history.

(56) References Cited

U.S. PATENT DOCUMENTS

| | | | |
|---|---|---|---|
| 2004/0057449 A1* | 3/2004 | Black | 370/432 |
| 2004/0125756 A1* | 7/2004 | Lepore et al. | 370/261 |
| 2004/0185838 A1* | 9/2004 | Seligmann | 455/417 |
| 2007/0058637 A1* | 3/2007 | Lo | 370/395.2 |
| 2007/0094490 A1* | 4/2007 | Lohr | 713/153 |
| 2008/0267385 A1* | 10/2008 | Provost et al. | 379/225 |

* cited by examiner

*Primary Examiner* — Suraj Joshi
(74) *Attorney, Agent, or Firm* — Cozen O'Connor

(57) ABSTRACT

A method of transmitting data streams representing stimuli of at least one particular type, including a first step of setting up transmission of a particular stream Vstr1 from an interface device INFD to a terminal LT1 initially selected as the destination terminal. The method further includes a step of identifying terminals CTj compatible with said particular stream Vstr1; a step of selecting as the new destination terminal LT2 of said particular stream Vstr1 a terminal that has been identified as compatible, and a second step of transmitting said particular stream Vstr1 to the new destination terminal LT2. The method authorizes dynamic control of stream sharing or transfer between two or more terminals with no branch connection between said terminals.

13 Claims, 2 Drawing Sheets

METHOD AND SYSTEM FOR THE DYNAMIC MANAGEMENT OF THE TRANSMISSION OF STREAMS WITHIN A PLURALITY OF TERMINALS

RELATED APPLICATIONS

This is a U.S. national stage under 35 USC 371 of application No. PCT/FR2007/050796, filed on Feb. 13, 2007.

This application claims the priority of French patent application no. 06/50556 filed Feb. 16, 2006, the content of which is hereby incorporated by reference.

FIELD OF THE INVENTION

The present invention relates to a method of transmitting data that represents a stimulus of at least one particular type and that is included in a stream that conforms to formats associated with said particular type, which stream is intended to be received by an interface device connected to a plurality of terminals.

BACKGROUND OF THE INVENTION

Such methods are routinely used in systems for transmitting data streams that represent audio and/or video stimuli and can therefore convey data representing cinematographic works or teleconferences proceeding in principle in real time, for example.

Because of a background trend producing effects that are apparent in the telecommunications industry in particular, data of various types is conveyed more and more frequently by means of a common infrastructure, usually employing one or more communications networks, for example a main network conforming to the Internet Protocol cooperating with one or more auxiliary networks, which could be networks of radio stations conforming to a third generation telephone protocol, e.g. the UMTS (Universal Mobile Telecommunications system) standard, cable local area networks, e.g. conforming to the Ethernet (IEEE 802.3) standard, or wireless local area networks, for example conforming to the WiFi (IEEE 802.11) standard.

An auxiliary network can be provided in a home by a local area network of a particular type in which an interface device, for example a home gateway, provides an interface between the main and auxiliary networks and is physically connected to a plurality of terminals such as a television receiver, a personal computer, a telephone, possibly a videophone, etc.

In the current state of the art, known interface devices are arranged so that certain terminals known as dedicated terminals are intended to send or receive only one type of data stream, for example a television receiver receives a data stream representing a television program. For that kind of dedicated terminal to be able to receive a data stream of some other type, assuming that it would be more advantageous to use the dedicated terminal to play back the stimulus concerned, an auxiliary network user must, should it be physically possible, set up a branch connection between the dedicated terminal and an initial terminal considered by the user as being less able than the dedicated terminal to play back the stimulus concerned. To return to the example in which the dedicated terminal is a television receiver, the initial terminal could be a videophone with a screen that is small and therefore less advantageous than the screen of the television receiver.

Thus to share a stream between terminals or to transfer a stream from one terminal to another, a user of the auxiliary network must set up a physical connection between those terminals, representing a time and hardware investment and resulting in the presence in their environment of a cable that is generally unattractive, and that must furthermore be present all the time to allow dynamic control of stream sharing or transfer.

SUMMARY OF THE INVENTION

One object of the invention is to avoid these drawbacks by providing a method of transmitting data that enables dynamic control of stream sharing or transfer between at least two terminals without requiring a branch connection to be set up between said terminals.

This and other objects are attained in accordance with one aspect of the invention directed to a method including a first step of setting up transmission of a particular stream from the interface device to an initial terminal selected beforehand as the destination terminal. The method further includes:
 a step of identifying a compatible terminal other than the initial terminal able to play back a stimulus of the type associated with the format of said particular stream;
 a step of selecting as a new destination terminal of said particular stream a terminal that has been identified as compatible; and
 a second step of setting up transmission of said particular stream to said new destination terminal.

In a method according to an embodiment of the invention, a command to share or transfer a stream between an initial terminal and a new destination terminal leads to setting up transmission of said stream from the interface device and not from the initial terminal, so that no branch connection between said terminals is required. This enables totally dynamic management of sharing and transferring streams of any type, which acquires an additional dimension through the selection step, during which not just one but a plurality of terminals are retained as potential receivers of a particular stream.

According to a first variant of the invention, after execution of the second step of setting up transmission the initial terminal and the new destination terminal are simultaneously destination terminals of the particular stream.

This first variant achieves sharing of the particular stream by, as it were, duplicating the stream to enable simultaneous playback on two separate terminals of the stimuli conveyed by that stream. This is beneficial for a user who has cause to move during transmission of the particular stream, for example from a room containing the initial terminal to another room in which the new destination terminal is located. On this assumption, duplicating the particular stream enables users to avoid interrupting their perception of the stimuli conveyed by the duplicated stream. This possibility is also of interest if a user of the initial terminal wishes another user, for example located in another room, also to receive the stimuli conveyed by the particular stream.

According to a second variant of the invention, after execution of the second step of setting up transmission, transmission of the particular stream to the initial terminal is interrupted.

This second variant effects a simple transfer from the initial terminal to the destination terminal. For example, this is advantageous for preventing broadcasting of certain streams under conditions that would infringe ownership rights attached to those streams. Thus a license might have been granted for only one of the users of the auxiliary network to access a content conveyed by a particular stream, and so, to guarantee that the terms of the license are complied with at the same time as enabling the user concerned to change terminal, only transfer of the content is possible, and not sharing of the content.

The particular stream could itself convey information representing authorizations to use the first and/or second implementations described above, and one of them could be chosen beforehand as the default implementation.

The first and second variants described above are not mutually exclusive in absolute terms, because a user might initially choose to duplicate the particular stream and decide afterwards to cancel transmission of that stream to the initial terminal.

In one particular implementation of the invention, the identification step includes a step of generating a list of terminals offering resources available in sufficient quantity to play back effectively stimuli conveyed by the particular stream.

The above implementation identifies as compatible terminals auxiliary network terminals that offer, in addition to intrinsic technical characteristics that enable them to play back stimuli conveyed by the particular stream, sufficient resources to play back said stimuli at the time concerned. This implementation therefore optimizes dynamic control of stream sharing and transfer as made possible by the invention by taking into account in real time the operating conditions of the auxiliary network.

In one advantageous implementation of the invention, a method as described above further including a step of compiling a list of streams from which it is intended that the particular stream will be chosen.

A compilation step of this kind produces for an auxiliary network user a list of streams that are potential candidates to share with or transfer to a terminal other than the current destination terminal. This makes application of the invention highly flexible, since a user can choose as the particular stream any of the streams in the list produced by the compilation step.

In the various possible implementations, the second step of setting up transmission includes an invitation step during which a remote terminal sending the particular stream is invited to enter into communication with the second terminal.

The step of selecting terminals could simply be effected by copying data conveyed by the particular stream in the event of sharing said particular stream or rerouting data by setting demultiplexing parameters in the event of transferring said particular stream. However, in such implementations, the stream retains its intrinsic properties, for example its intrinsic bit rate, whereas the invitation step offers the sending device the opportunity to modify those properties on sending to make the resulting stream easier for the new destination terminal to process. What is more, in some circumstances the invitation step can bring about additional transmission of a different type of stream that was not previously transmitted to the initial terminal, for example a video stream sent to the new destination terminal, for example a television set, in addition to an audio stream, assuming that the initial terminal, for example a telephone handset, had received only the audio stream, and the new destination terminal can then play back a videoconference rather than a telephone conversation.

Another aspect of the invention relates to a system for transmitting data representing at least one stimulus of a particular type and that is included in a stream that conforms to a format associated with said particular type, the system including an interface device connected to a plurality of terminals and able to receive a particular stream and to transmit said stream to an initial terminal selected beforehand as the destination terminal, which system further includes:

means for identifying a compatible terminal other than the initial terminal able to play back stimuli of the type associated with the format of said particular stream;
 means for selecting as a new destination terminal of said particular stream a terminal that has been identified as compatible; and
 means for setting up transmission of said particular stream to said new destination terminal.

Another hardware aspect of the invention relates to means for implementing it in the form of an interface device for connection to a plurality of terminals and able to receive data that represents at least one stimulus of a particular type and that is included in a stream that conforms to a format associated with said particular type, said device being able to transmit said stream to an initial terminal selected beforehand as the destination terminal, which device further includes:

means for identifying a compatible terminal other than the initial terminal and able to play back stimuli of the type associated with the format of said particular stream;
 means for selecting as a new destination terminal of said particular stream a terminal that has been identified as compatible; and
 means for setting up transmission of said particular stream to the new destination terminal.

A further hardware aspect of the invention relates to means for implementing it in the form of a computer program including a series of program code instructions for executing identification and/or selection steps of a method as described above when said program is executed on a computer.

A computer program of this kind can be stored in its entirety on a single memory medium, but could also be stored in sections in different elements of the transmission system described above.

The invention therefore also relates to a data medium storing a series of program code instructions for executing identification and/or selection steps of a method as described above.

BRIEF DESCRIPTION OF THE DRAWINGS

The invention can be better understood in the light of the following description, given by way of non-limiting example and with reference to the appended drawings, in which.

DETAILED DESCRIPTION OF THE DRAWINGS

Figure 1:
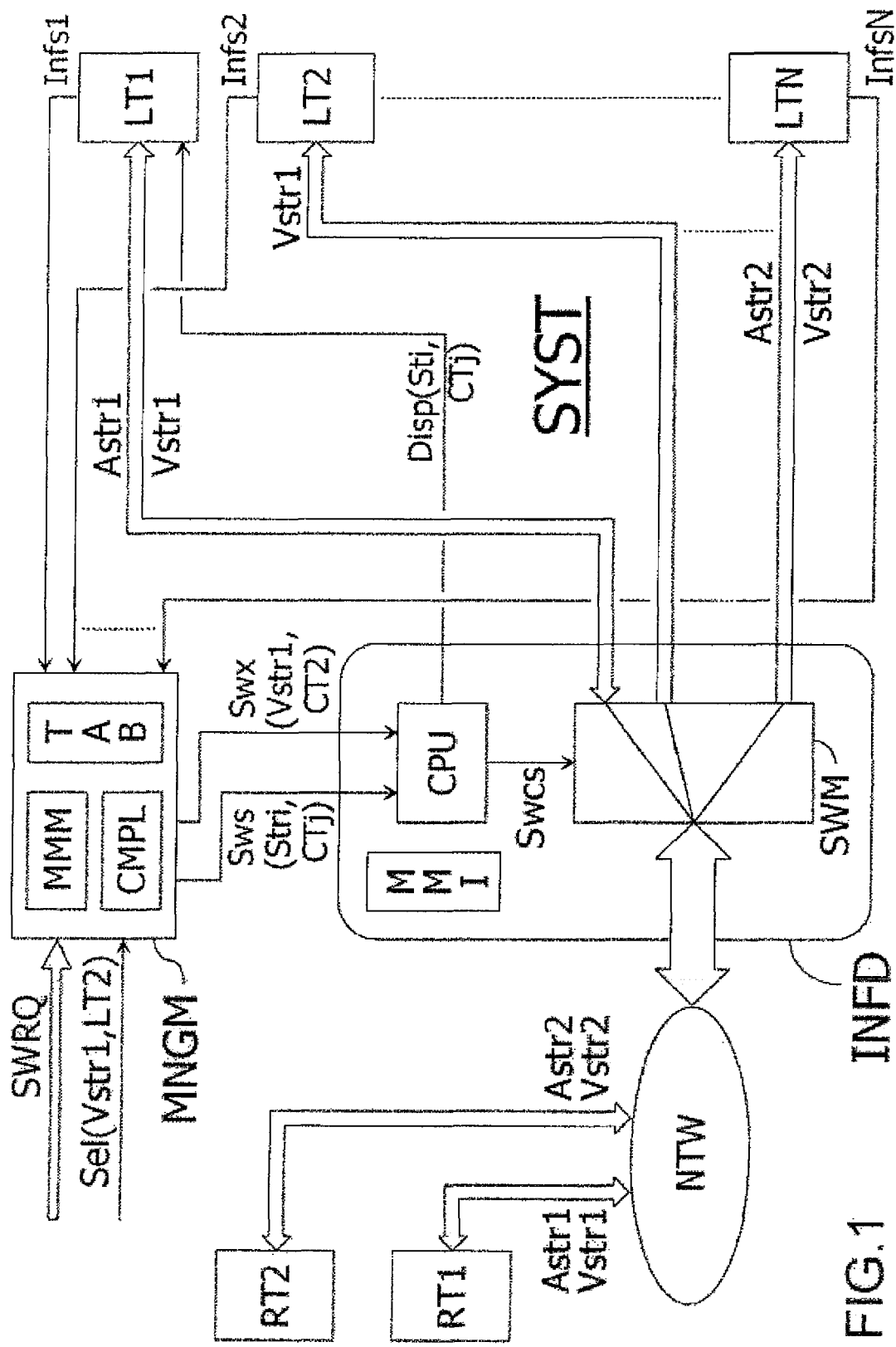
FIG. 1 is a functional block diagram of a telecommunications system implementing the present invention.

FIG. 1 is a diagram that represents a data transmission system SYST including a main communications network NTW, for example a meshed network compatible with the Internet Protocol, and an auxiliary network formed by an interface device INFD connected to local terminals LT1, LT2, . . . , LTN. In the example represented here, a first remote terminal RT1 exchanges with a first local terminal LT1, via the main network NTW and the interface device INFD, a first set of audio/video data streams that represents a videoconference and includes a first audio stream Astr1 and a first video stream Vstr1. Thus, in the example represented here, the local terminal LT1 is selected beforehand as the initial receiver of the first audio and video streams Astr1 and Vstr1. In the present example, a second remote terminal RT2 also sends to another local terminal LTN a second set of audio/video data streams which here represents a non-interactive television program and includes a second audio stream Astr2 and a second video stream Vstr2.

The transmission system SYST of the invention further includes a management module MNGM connected to the local terminals LT1, LT2, . . . , LTN to receive from them information signals Infs1, Infs2, . . . , InfsN by which the local terminals LT1, LT2, . . . , LTN communicate to the management module MNGM, dynamically and as far as possible in real time, their current operating conditions, for example a communication bit rate or a volume of calculations per second that they are still individually able to handle at the time concerned.

For a particular stream, the management module MNGM includes means for identifying a terminal adapted to play back stimuli of the type associated with the format of said particular stream, the identification means in this implementation comprising a table TAB for storing information sent by the local terminals LT1, LT2, . . . , LTN by means of the information signals Infs1, Infs2, . . . , InfsN and a unit CMPL for compiling this information adapted to generate, for each stream sharing or transfer of which can be envisaged, a list of terminals CTj with resources available in sufficient quantity to play back effectively the stimuli conveyed by the particular stream, said terminals CTj then being considered compatible with the stream concerned.

It must be emphasized here that, although in the implementation described here the management module MNGM is represented as physically separate from the interface device INFD, in other implementations of the invention the management module MNGM could advantageously be integrated into the interface device. Alternatively, this management module could be implemented in a totally distributed form by dividing its functions between different local terminals and possibly the interface device INFD.

The transmission system SYST of the invention further includes means for selecting as the new destination terminal of a particular stream a terminal identified as being compatible therewith. In the implementation described here, the selection means are distributed between elements of the system SYST. The selection means incorporate certain man/machine interface elements not represented here enabling a terminal user to interact with the interface device via the terminal.

Thus for a user of the local area network to be able to use a change request signal SWRQ to indicate that they wish to effect stream sharing or transfer, for example so that the images of the videoconference played back by the first local terminal LT1 are also displayed by a second local terminal LT2, they must be provided with technical means for formulating that request, for example a graphical user interface/mouse combination enabling them to set up a indirect connection with the management module MNGM from a local terminal formed by a personal computer; the means for formulating a request can be a remote controller enabling the user to set up a direct link with the management module MNGM or an indirect link via a scrolling menu displayed on one of the local terminals, for example a television.

The selection means can equally include a central processor unit CPU, here located in the interface device INFD, intended to receive from the management module MNGM a control signal Sws(Stri,CTj) by means of which the management module MNGM informs the interface device INFD that a change request SWRQ has been sent by a user, in this example the user of the local terminal LT1, the control signal instructing the central processor unit CPU to send a display message Disp(Stri,CTj) to display on a screen of the local terminal LT1 a list of streams Stri that can be shared or transferred and list(s) of terminals CTj identified as compatible with those streams Stri. In response to a display of this kind, the user produces a selection signal to identify streams that they wish to share with or transfer to other terminals also identified by the selection signal. In the present example, the selection signal Sel(Vstr1,LT2) identifies, as the predetermined stream to be shared with the second local terminal LT2, the stream Vstr1 forming the video component of the first set of streams conveying a videoconference to the first local terminal LT1.

After reception of the selection signal Sel(Vstr1,LT2), the compilation unit CMPL generates an action signal Swx (Vstr1,CT2) by means of which the management module MNGM instructs the central processor unit CPU in the interface device to execute a second step of sending the stream Vstr1 to the second local terminal LT2. To this end, the central processor unit CPU produces a control signal Swcs for a switching module SWM intended to set up this second transmission and that can include for this purpose means for sending via input/output ports and a unit for managing interconnections between ports.

In one particular implementation of the transmission system SYST described above, identification and selection sequences can be stored beforehand and offered in summary form to a user who has sent a change request signal SWRQ indicating that they wish to share or transfer a stream. Such summarized offers could take the form of choices that the management module MNGM has deemed to be realistic as a function of the content of the information signals Infs1, Infs2, . . . , InfsN. Thus, if the resources of the second local terminal LT2 should prove to be compatible with the nature of the video stream Vstr1, the management module MNGM can validate display of a predefined choice message of the "Switch video from LT1 to LT2" type, which display will otherwise be inhibited. The user has only to approve the content of this choice message for the sequence designated by said choice message to be executed as described above. This frees the user of determining the streams concerned one by one and searching for the destination terminals. The user will also be freed of explicitly instructing sharing or transfer of the stream or streams concerned. All these options are determined beforehand and once and for all when the sequence designated by the predefined message is stored.

With a view to implementing the identification and selection steps described above, following which in this example the identification and selection means produce the signals Sws(Stri,CTj), said identification and selection means are controlled by series of program code instructions written in memory media MMM and MMI, for example SDRAM (synchronous dynamic random access memory) modules included in the management module MNGM and the interface device INFD, respectively, which instructions are intended to be executed by the compilation unit CMPL and the central processor unit CPU.

Note that the interface device INFD can include transcoding means for translating a data stream passing through it from one format to another with a view to adapting the format of that stream to the type of terminal for which said stream is intended, in order to optimize use of the resources offered by that terminal. Thus a video stream Vstr1 initially coded to a H.263 format compatible with Camera Phone terminals could be transcoded on the instructions of the management module MNGM to an MPEG4 format compatible with a new destination terminal of the television type. Such transcoding means could use the central processor unit CPU in cooperation with a memory medium MMI in which various transcoding programs are stored beforehand.

Furthermore, subject to a hypothesis that is not represented here, whereby the management module MNGM itself would include selection and transmission means that would enable it, as it were, to short-circuit the interface device INFD, and would then, as it were, constitute an interface device auxiliary to said interface device INFD, this management module MNGM could send the new destination terminal streams identified and selected by said management module MNGM itself. Under such circumstances, transcoding means such as those referred to above are advantageously included in the same management module MNGM.

Figure 2:
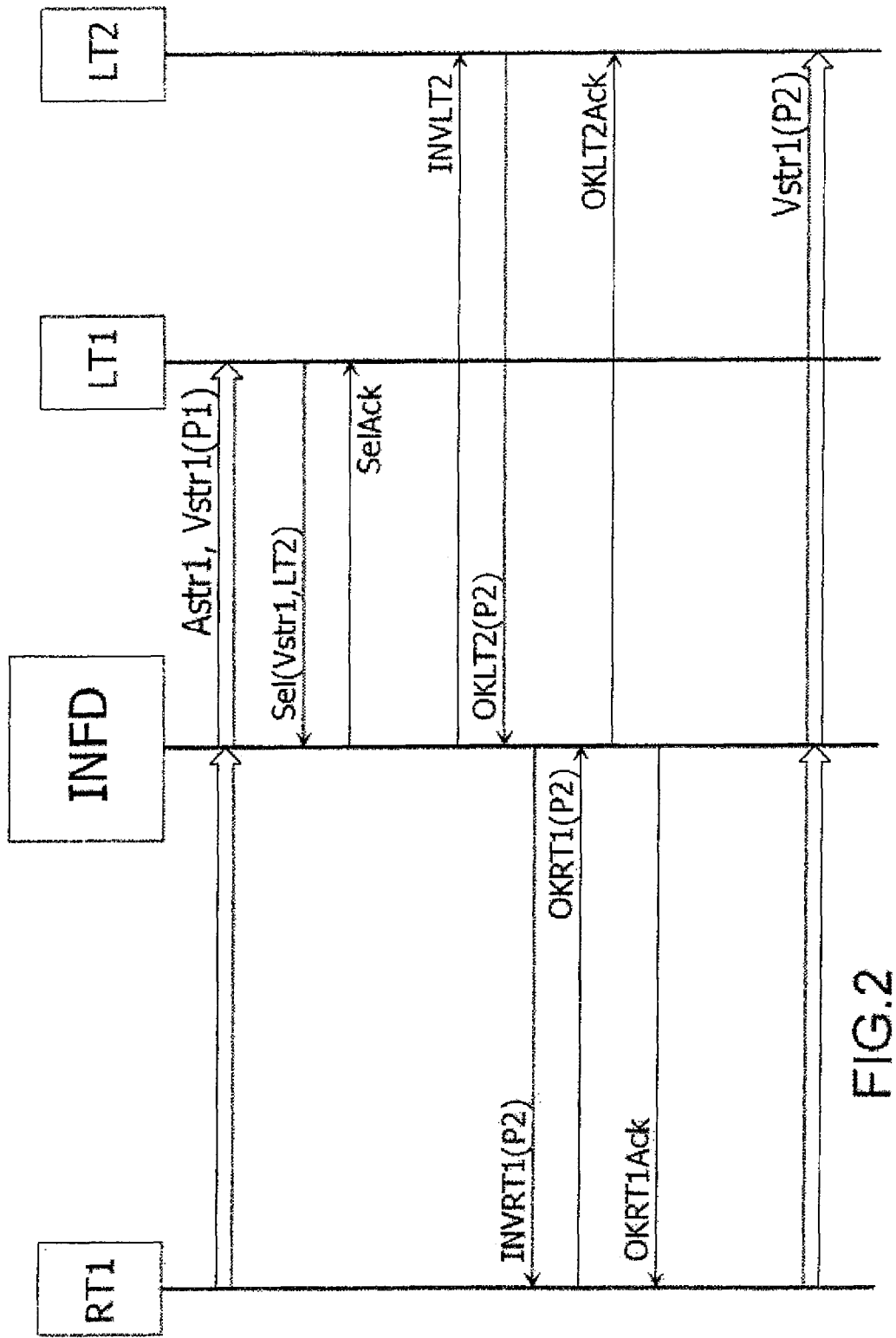
FIG. 2 is a communications stream diagram showing an exchange of signals in this kind of system.

FIG. 2 is a communications stream diagram that shows one particular implementation of the second step of setting up transmission described above, occurring after a first step of setting up transmission during which a first local terminal LT1 was selected as the initial receiver of a set of audio and video streams Astr1 and Vstr1 sent by a remote terminal RT1. To simplify the explanation, the description of this particular implementation is based on the assumption that the management module described above is integrated into the interface device, which thus occupies a central place that cannot be circumvented in exchanges between local and remote terminals. In other implementations of the invention, the management module could itself organize the communication exchanges to be described below, or even execute them, independently of the interface device.

Having received a change request signal and executed a step of identifying compatible terminals, the interface device INFD receives a selection signal from the local terminal LT1 identifying the stream Vstr1 as the particular stream and the second local terminal LT2 as the new destination terminal of said particular stream. The interface device INFD then in turn sends a signal SelAck acknowledging reception of said selection signal, after which the interface device INFD executes a first invitation step by sending a first invitation message INVLT2 to the second local terminal LT2, which responds to that invitation message with an acceptance message OKLT2 (P2) specifying one or more parameters P2 representing intrinsic properties that the second local terminal would wish to be assigned to the stream Vstr1, for example a bit rate value that would make the resulting stream easier for the new destination terminal to process.

During a second invitation step, by means of a second invitation message INVRT1(P2), the interface device INFD invites the remote terminal RT1 to enter into communication with the second local terminal LT2 in order to send it the stream Vstr1, the second information message INVRT1(P2) including parameter(s) P2 representing intrinsic properties that the remote terminal RT1 must assign to the stream Vstr1 to meet the conditions set by the second local terminal LT2. If, as applies here, those conditions are compatible with the operating conditions of the remote terminal RT1, that terminal sends in return an acceptance message OKRT1(P2), after which the interface device INFD in turn signals to the second local terminal LT2 and to the remote terminal RT1 that it has received their acceptance messages and that transmission of the stream Vstr1(P2) with the intrinsic properties defined by the parameter(s) P2 can now be executed.

Transmission from the remote terminal to the second local terminal can then be set up either directly between said terminals or, as applies here, via the interface device, which receives the stream Vstr1(P2) at one of its input ports and switches that stream to one of its output ports, which is connected to the second local terminal LT2.

The local area network user can subsequently decide to interrupt transmission of the stream Vstr1(P1) initially set up to the first local terminal LT1 subject to specific conditions represented by one or more parameters P1 specific to that particular transmission.

The invention claimed is:

1. A method of transmitting data that represents at least one stimulus of a particular type and that is included in a stream that conforms to a format associated with said particular type, which stream is adapted to be received by an interface device arranged between a main network and an auxiliary network formed by the interface connected to a plurality of terminals, the method comprising:
    a first step of setting up transmission of a particular stream of a remote terminal, from the interface device to an initial terminal selected beforehand as a destination terminal among the plurality of terminals of the auxiliary network;
    a step of identifying at least one compatible terminal of the auxiliary network, other than the initial terminal, able to play back stimuli of the type associated with the format of said particular stream, based on information signals received from the plurality of terminals of the auxiliary network, the information signals comprising data relating to current operating conditions of the at least one compatible terminal;
    a step of selecting as a new destination terminal of said particular stream a second terminal of the auxiliary network identified as compatible in the identifying step; and
    a second step of setting up transmission of said particular stream from the interface device to the second terminal of the auxiliary network;
    wherein the second step of setting up transmission includes an invitation step during which the remote terminal sending the particular stream is invited by the interface device to enter into communication with the second terminal of the auxiliary network.

2. The method according to claim 1, wherein, after execution of the second step of setting up transmission, the initial terminal and the second terminal are simultaneously destination terminals of the particular stream.

3. The method according to claim 1, wherein, after execution of the second step of setting up transmission, transmission of the particular stream to the initial terminal is interrupted.

4. The method according to claim 1, wherein the identifying step includes a step of generating a list of terminals of the auxiliary network offering resources available in sufficient quantity to play back effectively stimuli conveyed by the particular stream.

5. The method according to claim 1, further including a step of compiling a list of streams from which the particular stream is intended to be chosen.

6. A non-transitory computer-readable storage medium storing a computer program including a series of program code instructions for executing identifying and/or selecting steps of a method according to claim 1 when said program is executed on a computer.

7. The method according to claim 1, wherein the current operating conditions of the at least one compatible terminal comprise at least one of a communication bit rate and a calculation capability of the at least one compatible terminal.

8. The method according to claim 1, wherein the invitation step includes sending an invitation message to the remote terminal, the invitation message comprising properties for the remote terminal to assign to said particular stream to meet conditions set by the second terminal of the auxiliary network.

9. The method according to claim 8, wherein the invitation step further includes, prior to sending the invitation message to the remote terminal:
   sending an invitation message to the second terminal of the auxiliary network; and
   receiving an acceptance message from the second terminal comprising at least one parameter representing properties to be assigned to said particular stream by the remote terminal to facilitate reception by the second terminal.

10. A system for transmitting data that represents a stimulus of at least one particular type and that is included in a stream that conforms to a format associated with said particular type, the system comprising:
   a main network;
   an interface device connected to a plurality of terminals of an auxiliary network formed by the interface device and the plurality of terminals, the interface device being able to receive a particular stream of a remote terminal, and to transmit said stream to an initial terminal selected beforehand as a destination terminal among the plurality of terminals of the auxiliary network, said interface device being arranged between the main network and the plurality of terminals of the auxiliary network;
   means for identifying at least one compatible terminal of the auxiliary network, other than the initial terminal, and able to play back stimuli of the type associated with the format of said particular stream, based on information signals received from the plurality of terminals of the auxiliary network, the information signals comprising data relating to current operating conditions of the at least one compatible terminal;
   means for selecting as a new destination terminal of said particular stream a second terminal of the auxiliary network identified as compatible by the means for identifying; and
   means for setting up transmission of said particular stream from the interface device to said second terminal of the auxiliary network;
   wherein the means for setting up transmission performs an invitation step during which the remote terminal sending the particular stream is invited by the interface device to enter into communication with the second terminal of the auxiliary network.

11. The system according to claim 10, wherein the current operating conditions of the at least one compatible terminal comprise at least one of a communication bit rate and a calculation capability of the at least one compatible terminal.

12. An interface device for connection to a plurality of terminals of an auxiliary network formed by the interface device and the plurality of terminals, the interface device being able to receive data that represents a stimulus of at least one particular type and that is included in a stream, from a remote terminal, that conforms to a format associated with said particular type, said device being able to transmit said stream to an initial terminal selected beforehand as a destination terminal among the plurality of terminals of the auxiliary network, the interface device comprising:
   means for identifying at least one compatible terminal of the auxiliary network, other than the initial terminal, and able to play back stimuli of the type associated with the format of said particular stream, based on information signals received from the plurality of terminals of the auxiliary network, the information signals comprising data relating to current operating conditions of the at least one compatible terminal;
   means for selecting as a new destination terminal of said particular stream a second terminal of the auxiliary network that has been identified as compatible by the means for identifying; and
   means for setting up transmission of said particular stream from the interface device to the second terminal of the auxiliary network;
   wherein the means for setting up transmission performs an invitation step during which the remote terminal sending the particular stream is invited by the interface device to enter into communication with the second terminal of the auxiliary network; and
   wherein the interface device is configured for arrangement between a main network and the plurality of terminals of the auxiliary network.

13. The interface device according to claim 12, wherein the current operating conditions of the at least one compatible terminal comprise at least one of a communication bit rate and a calculation capability of the at least one compatible terminal.

* * * * *